(12) United States Patent
Raad

(10) Patent No.: US 11,359,753 B2
(45) Date of Patent: Jun. 14, 2022

(54) MISALIGNMENT ACCOMMODATING HYDRAULIC COUPLER

(71) Applicant: Vetco Gray Scandinavia AS, Sandvika (NO)

(72) Inventor: Erik Raad, Hovik (NO)

(73) Assignee: VETCO GRAY SCANDINAVIA AS, Sandvika (NO)

( * ) Notice: Subject to any disclaimer, the term of this patent is extended or adjusted under 35 U.S.C. 154(b) by 0 days.

(21) Appl. No.: 17/280,271

(22) PCT Filed: Oct. 15, 2019

(86) PCT No.: PCT/EP2019/025350
§ 371 (c)(1),
(2) Date: Mar. 26, 2021

(87) PCT Pub. No.: WO2020/078587
PCT Pub. Date: Apr. 23, 2020

(65) Prior Publication Data
US 2022/0049806 A1 Feb. 17, 2022

(30) Foreign Application Priority Data
Oct. 19, 2018 (NO) .................................. 20181340

(51) Int. Cl.
*F16L 37/35* (2006.01)
*F16L 27/04* (2006.01)
*F16L 37/52* (2006.01)
*F16L 29/04* (2006.01)
*F16L 37/32* (2006.01)

(52) U.S. Cl.
CPC ............... *F16L 37/35* (2013.01); *F16L 27/04* (2013.01); *F16L 37/32* (2013.01); *F16L 37/52* (2013.01); *F16L 29/04* (2013.01)

(58) Field of Classification Search
CPC . F16L 37/52; F16L 27/04; F16L 27/06; F16L 27/073; F16L 29/04; F16L 37/35
See application file for complete search history.

(56) References Cited

U.S. PATENT DOCUMENTS

| | | | | |
|---|---|---|---|---|
| 2,071,750 A | * | 2/1937 | Kusebauch | F16L 27/06 285/269 |
| 3,645,294 A | * | 2/1972 | Allread | F16L 27/04 137/614.03 |
| 4,180,285 A | | 12/1979 | Reneau | |
| 4,482,171 A | * | 11/1984 | Campbell | F16L 27/023 285/95 |

(Continued)

FOREIGN PATENT DOCUMENTS

| | | | | |
|---|---|---|---|---|
| DE | 4323758 A1 | * | 4/1994 | .......... F16L 55/1015 |
| DE | 4323758 A1 | | 4/1994 | |
| FR | 2360028 A1 | | 2/1978 | |

*Primary Examiner* — David Colon-Morales
(74) *Attorney, Agent, or Firm* — Baker Hughes Patent Org.

(57) ABSTRACT

The invention relates to a hydraulic coupler. The coupler comprises a male and female coupling, each with a poppet valve moveably supported by an inner surface of a main body of the coupling. Each coupling further comprises a movable connector part in its front end with a spherical rear surface accommodating a spherical connector seat in the main body, where the connector is provided with sealing means between the connector part and the main body of the coupling.

8 Claims, 5 Drawing Sheets

(56) References Cited

U.S. PATENT DOCUMENTS

| | | | | | |
|---|---|---|---|---|---|
| 4,506,862 | A | * | 3/1985 | Spinosa | F16L 37/42 |
| | | | | | 251/149 |
| 5,181,689 | A | * | 1/1993 | Makishima | F16L 29/04 |
| | | | | | 251/149.6 |
| 5,191,914 | A | * | 3/1993 | Gonzalez | F16L 29/04 |
| | | | | | 137/614 |
| 6,056,329 | A | * | 5/2000 | Kitani | F16L 27/026 |
| | | | | | 285/145.3 |
| 8,931,499 | B2 | * | 1/2015 | Clever | F16L 37/40 |
| | | | | | 137/1 |
| 9,926,083 | B2 | * | 3/2018 | Powell | F16L 29/02 |
| 10,514,121 | B2 | * | 12/2019 | Wada | F16L 37/32 |
| 2008/0122221 | A1 | * | 5/2008 | Bridgewater | F16L 27/04 |
| | | | | | 285/184 |
| 2010/0295293 | A1 | * | 11/2010 | Healy | F16L 25/01 |
| | | | | | 285/95 |

\* cited by examiner

MISALIGNMENT ACCOMMODATING HYDRAULIC COUPLER

FIELD OF THE INVENTION

The present invention relates to a hydraulic coupler that can accommodate misalignment between two parts to be coupled.

BACKGROUND OF THE INVENTION

Hydraulic couplers are used in a variety of technical areas. Connection systems using hydraulic couplers, e.g. for subsea production, connecting tubulars in deep waters are subject to high static and dynamic structural loads due to misalignment of parts to be coupled, as well as high external and internal fluid pressure loads.

Currently, coupler misalignments in connection systems are normally accommodated by allowing float of couplers and bending of attached tubulars, to alleviate stresses from reaction forces in the couplers. Some of the disadvantages with such a connection system is that bending of the attached tubulars may result in considerable reaction forces into the couplers, and that float connection systems often relies on a complicated interface to preserve its internal components. The coupler according to the invention can be coupled in the connection system without float, giving little or no reaction forces from tube bending into the couplers. The invention omits a complicated interface towards a tubing arrangement, and can be used in connection with other hydraulic channels than tubulars.

The invention can be used in subsea production, topside, or any place where manual coupling is difficult or not possible.

BRIEF SUMMARY OF THE INVENTION

The present invention relates to a misalignment accommodating hydraulic coupler. In the following description, the term "coupler" refers to a female coupling connected to a male coupling. The coupler of the present invention relies on an external locking mechanism not further disclosed or shown in the drawings.

Specifically the invention relates to a sealing arrangement with a male connector and a female connector in a front part of a male and a female coupling part. Both the male connector and the female connector are free to tilt relative to a stabbing or mating direction of the male and female hydraulic coupling parts. The sealing arrangement in each of the female and male coupling parts includes a face-seal arranged on a spherical interface to ensure sealing independent of a tilt away from an axis of stabbing. By allowing tilting, the coupler can accommodate both axial offset and angular misalignment. Initial sealing contact in the spherical interface is ensured by a spring. By locating a radial seal at a larger diameter than the face-seal on each of the spherical interfaces, an internal pressure will ensure face-seal loading. Therefore, the coupler is allowed to be coupled without a floating attachment and reaction forces imposed by the tube on the couplers are reduced.

In an embodiment, the invention relates to a hydraulic coupler comprising a female coupling adapted to be coupled to a male coupling, wherein each of the female coupling and the male coupling comprises a flow path connecting portion, a poppet valve body moveably supported by an inner surface of a main body along its centre axis and a valve body spring biasing the poppet valve body in a forward direction against a valve seat in the main. In this embodiment, the invention further relates to an actuator stem on the poppet valve body, a movable connector with a spherical portion seating against a spherical connector seat in the main body, where the connector is provided with a through bore with a larger diameter than an actuator stem diameter, wherein the actuator stem extends through the through bore, and wherein the movable connector is one of a female connector and a male connector and at least one sealing ring forming a face-sealing between the spherical portion seating and the spherical connector seat.

DETAILED DESCRIPTION OF THE INVENTION

For the purpose of explaining the function of the coupler of the invention, the coupler is considered to be submerged in fluid such as seawater. The coupler can also be used topside.

It should be noted that when describing shapes such as conical, convex, concave and spherical, the terms are meant to also comprise a frustum of such shapes. The spherical seat and the spherical part of the male and the female connector to be described are only intended to describe a part of a sphere as will be readily apparent from the figures and the following description.

The term "front" is relative to each of the couplings, and refers to the direction towards the end of each couplings pointing away from the tubulars. The term "rear" is also relative to each of the couplings, and refers to the opposite direction of the front direction. The terms "front side" and "rear side" refer to the sides facing the front direction and the rear direction respectively.

Figure 1:
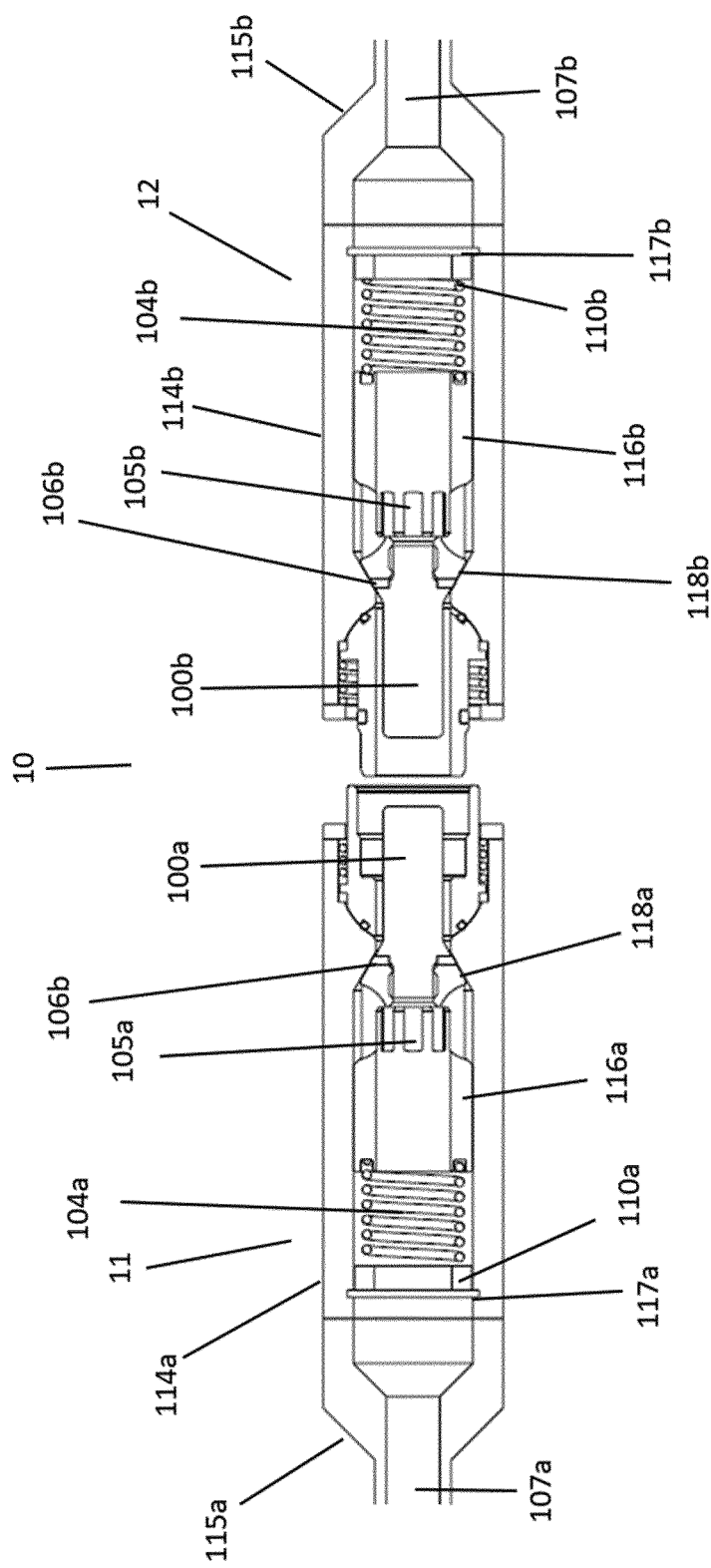
FIG. 1 illustrates a longitudinal cross section of the misalignment accommodating hydraulic coupler in an uncoupled state.

FIG. 1 shows a longitudinal, cross sectional view of an embodiment of a misalignment accommodating hydraulic coupler 10 in an uncoupled state.

The coupler comprises a male coupling 12 and a female coupling 11 connecting two tubulars 107a, 107b providing a flow path to allow fluid flow. Each coupling 11, 12 is connected to a tubular 107a, 107b, and each coupling comprises, at a rear end, a transition section 115a, 115b which is partly cylindrical and partly conical both inside and outside, and connects the tubular 107a, 107b to the coupling 11, 12. An inner surface of the transition section 115a, 115b is partly cylindrical and partly conical. The transition section 115a, 115b connects to a main body 114a, 114b, and thereby acts as a connecting portion, connecting the flow path to the main body 114a, 114b of the coupler.

The main body 114a, 114b of each of the male coupling 12 and the female coupling 11 include a substantially cylindrical outer surface, and accommodates the interior components of the coupling 11, 12. The main body 114a, 114b has typically a constant outer diameter and a variable inner diameter. The main body 114a, 114b has a centre axis in line with the centre axis of the tubular 107a, 107b and the centre axis of the transition section 115a, 115b. The main body 114a, 114b comprises an inner cavity accommodating and supporting a poppet valve body 116a, 116b.

The poppet valve body 116a, 116b is cylindrical and includes an internal bore though which fluids can flow. The poppet valve body 116a, 116b is moveable along a centre axis within the main body 114a, 114b. A rear end of the poppet valve body 116a, 116b, engages, and is biased by, a helical valve body spring 104a, 104b supported by a spring seat 110a, 110b fixed to the main body 114a, 114b with a spring seat collar 117a, 117b. The helical valve body spring 104a, 104b urges the poppet valve body forward towards an inner valve seat 118a, 118b. The inner valve seat 118a, 118b includes an inner conical surface formed in the main body 114a, 114b. A poppet seal 106a, 106b seals against the valve seat 118a, 118b when the poppet valve body 116a, 116b, is urged forward. Fluid from the respective tubulars 107a, 107b and from the outside is prevented from flowing past the poppet seal 106a, 106b. The poppet valve body 116a, 116b further comprises fluid passage slots 105a, 105b.

An actuator stem 100a, 100b extends from a front end of the poppet valve body 116a, 116b. The actuator stem 100a, 100b is designed for mutual axial engagement with the actuator stem 100a, 100b of the opposite coupling 11, 12.

Figure 2:
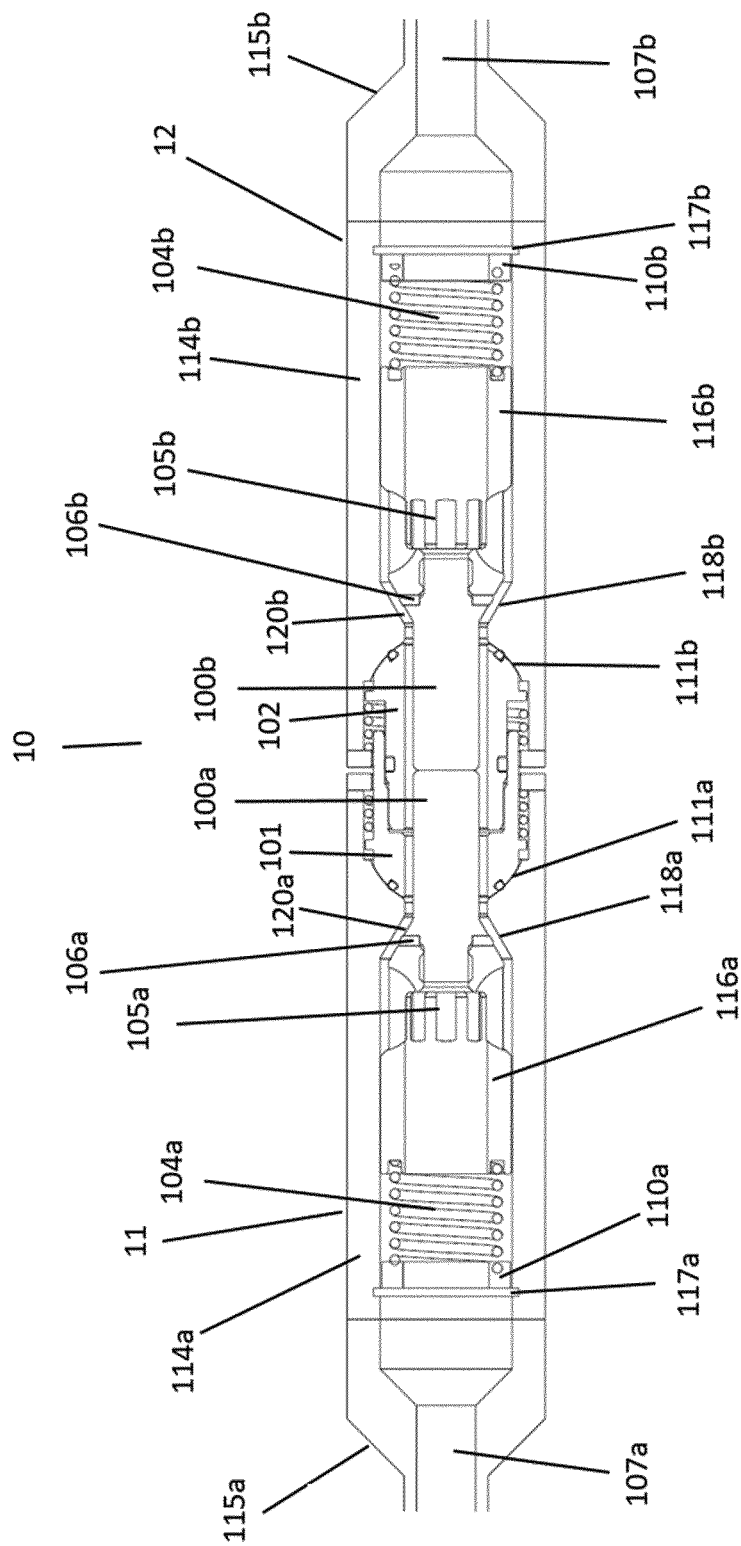
FIG. 2 illustrates the misalignment accommodating hydraulic coupler of FIG. 1 in a coupled state.

FIG. 2 illustrates the misalignment accommodating coupler 10 in a coupled state. In the coupled state, the coupler 10 allows for fluid flow between the two tubulars 107a, 107b. When the couplings 11, 12 are connected, the actuator stems 100a, 100b are axially forced against each other forcing the poppet valve bodies 116a, 116b rearwards against the spring force of the helical valve body springs 104a, 104b seated in the spring seats 110a, 110b, opening up an annulus 120a, 120b between the poppet valve body 116a, 116b and the valve seat 118a, 118b of the male coupling 12 and the female coupling 11. The coupler 10 further comprises a female connector 101 and a male connector 102 with seals preventing ingress of surrounding water.

Figure 3:
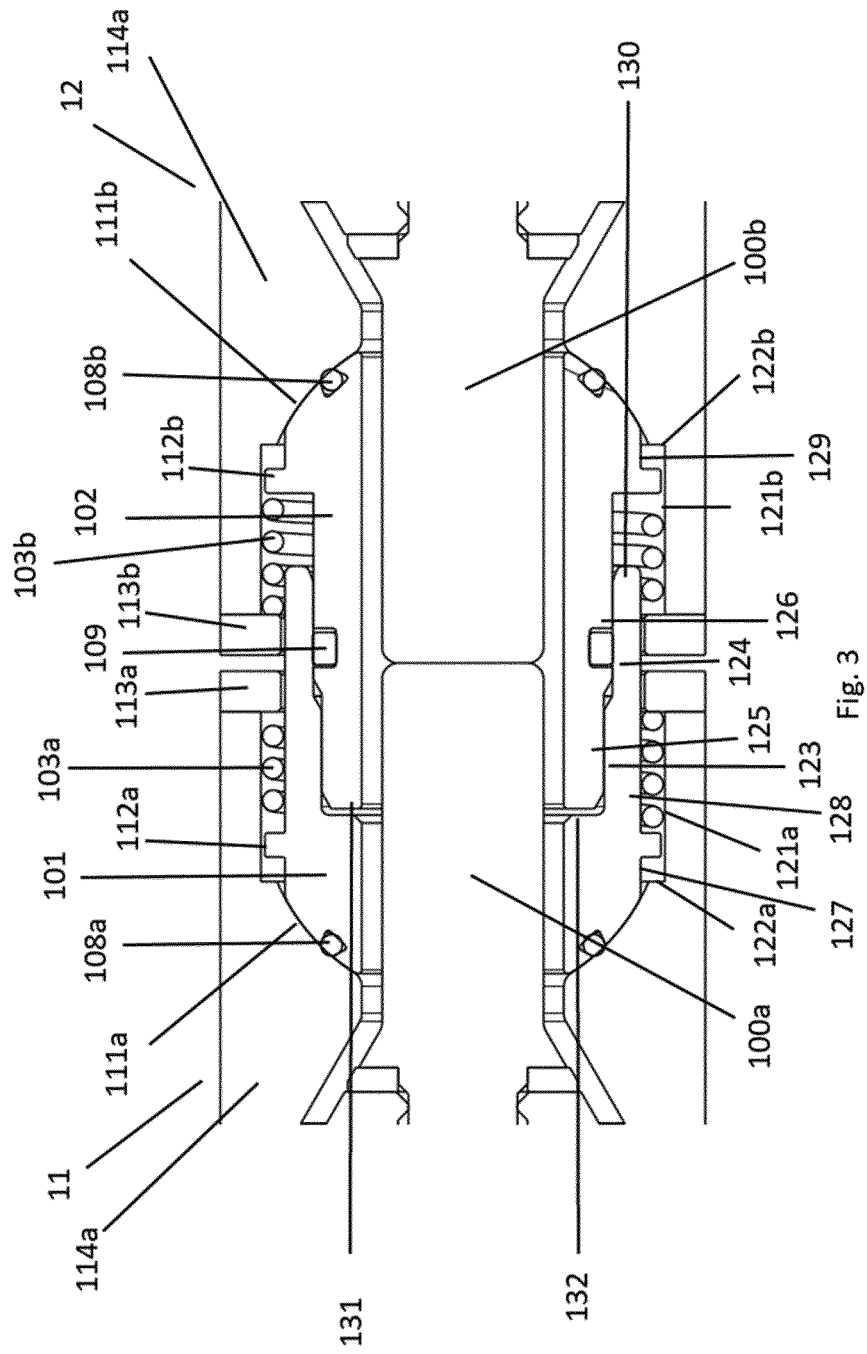
FIG. 3 is a detailed view of FIG. 2.

FIG. 3 shows the front ends of the couplings 11, 12 in a coupled state in greater detail. The main body 114a, 114b has a cavity in its front end. The rear end of this cavity includes a spherical surface forming a connector seat 111a, 111b, accommodating the connector 101, 102. The connector seat 111a, 111b is continued by a cylindrical surface section 121a, 121b having a larger diameter than the outer diameter of the front end of the connector seat 111a, 111b. A step 122a, 122b is defined between the connector seat 111a, 111b and the cylindrical surface section 121a, 121b.

A coupling face collar 113a, 113b with a smaller inner diameter than the cylindrical surface section 121a, 121b, is fixed to a front end of the main body 114a, 114b. The coupling face collar 113a, 113b is releasable. The connectors 101, 102 extend a distance past the coupling face collars 113a, 113b and also a distance past the actuator stems 100a, 100b.

The front cavity in the front end of the main body 114a of the male coupling 12 accommodates a male connector 102, and the front cavity in the front end of the main body 114b of the female coupling 11 accommodates a female connector 101.

A spherical rear surface providing a surface portion on both the male and the female connector 101, 102 conform to the spherical surface of the connector seat 111a, 111b.

The spherical rear surface of the female connector 101 is continued by a first cylindrical outer surface 127. A spring collar 112a forms a spring retainer around the first cylindrical outer surface 127. The first cylindrical outer surface 127 has a reduced diameter portion 128 between the spring collar 112a and a female end portion 130 facing the front end. An annulus is formed between the reduced diameter portion 128 of the first cylindrical outer surface 127 and the inner surface of the coupling face collar 113a, 113b, allowing movement of the connectors 101, 102.

The spherical rear surface of the male connector 102 is continued by a second cylindrical outer surface 129. A spring collar 112b forms a spring retainer around the second cylindrical outer surface 129. The second cylindrical outer surface 129 has a first reduced diameter portion 126 rear and a second reduced diameter portion 125 between the spring collar 112a and a male end portion 131 facing the front end. The second reduced diameter portion 125 has a smaller diameter than the first reduced diameter portion 126. The male connector 102 has a tubular front end with a constant inner diameter.

The step between the first reduced diameter portion 126 and the second reduced diameter portion 125 is inclined to facilitate insertion of the male connector 101 into the female connector 102.

The edge between the second reduced diameter portion 125 and the end surface 131 is inclined to facilitate insertion of the male connector 101 into the female connector 102.

The male and the female connectors 101, 102 both comprise a cylindrical bore of substantially the same diameter though their centre axis. The actuator stems 100a, 100b extend through the cylindrical bore of the connectors 101, 102. The diameter of the bores are larger than the diameter of the actuator stems 100a, 100b, whereby an annulus is formed between the actuator stems 100a, 100b and the inner surface of the bores of the connectors 101, 102. This annulus allows for movement of the connectors 101.

The female connector 101 has a tubular front end with a stepped inner diameter, providing a cylindrical inner surface 124 in front of a reduced diameter inner portion 123 between a circular inner surface 132 of the female connector and the female end portion 130. The edge between the cylindrical inner surface 124 and female end portion 130 is inclined to facilitate insertion of the male connector 101 into the female connector 102. The edge between the cylindrical bore of the female connector 101 and the circular inner surface 132 is inclined. In addition, the step between the cylindrical inner surface 124 and the reduced diameter inner portion 123 is inclined to facilitate insertion of the male connector 101 into the female connector 102.

In their coupled state, the stepped outer surface of the tubular front end of the male connector 102 is inserted into the stepped inner surface of the tubular front end of the female connector 101. The shape of the stepped inner surface of the tubular front end of the female connector 101 conforms to the shape of the stepped outer surface of the tubular front end of the male connector 102. At least one radial sealing ring 109 seals between the male connector 102 and the female connector 101.

Each connector 101, 102 is biased against the connector seat 111a, 111b by a helical connector spring 103a, 103b, located between the cylindrical surface section 121a, 121b of the main body 114a, 114b and the connector 101, 102. The helical connector spring 103a, 103b is supported at its front end by the coupling face collar 113a, 113b serving as a spring seat. The helical connector spring 103a, 103b engages, at its rear end, the spring collar 112a, 112b which is part of the connector 101, 102.

Each of the male and female connector 101, 102 further includes at least one sealing ring forming a face-seal 108a, 108b located in the rear spherical surface of the connector 101, 102 sealing against the connector seat 111a, 111b when the connector 101, 102 is forced rearwards. The at least one face-seal 108a, 108b is located in at least one circular recess in the rear spherical surface of the connector 101, 102.

Figure 4:
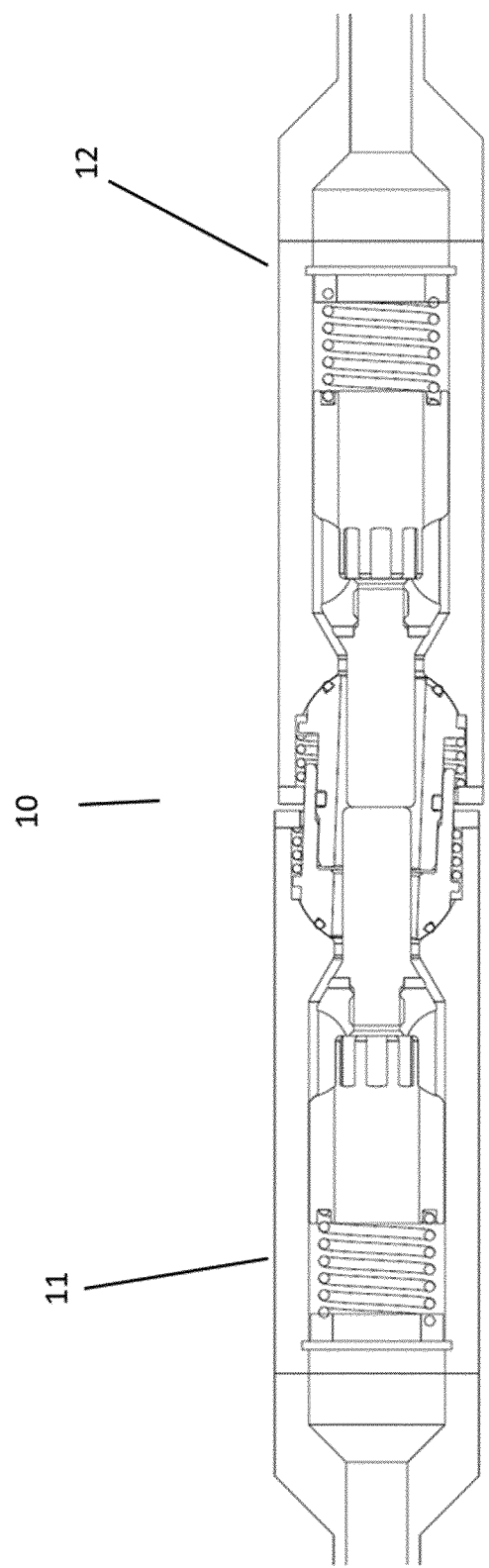
FIG. 4 illustrates the misalignment accommodating hydraulic coupler of FIG. 2 with axial offset.
Figure 5:
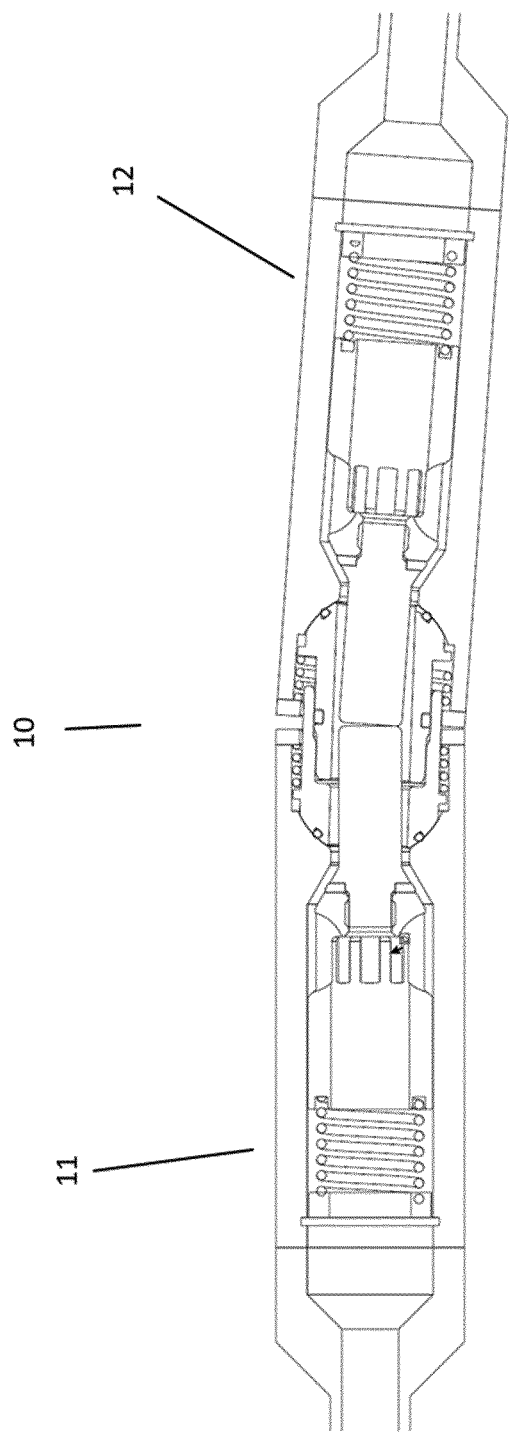
FIG. 5 illustrates the misalignment accommodating hydraulic coupler of FIG. 2 with angular misalignment.

The male and female connectors 101, 102 are tiltable to locate the centre axis of the connectors out of alignment with the centre axis of the couplings 11, 12 to accommodate both axial offset as illustrated in FIG. 4, angular misalignment as illustrated in FIG. 5, and reciprocal axial movement of the couplings 11, 12, reducing reaction forces from bending of the tubulars 107a, 107b into the couplings 11, 12. The spherical connector seats 111a, 111b and the accommodating spherical rear surfaces of the connectors 101, 102 enables the face-seals 108a, 108b to maintain contact with the connector seats 111a, 111b along the outer rim of the face-seals 108a, 108b, and thereby maintain sealing against the connector seat 111a, 111b even when the connectors are tilted.

The annulus between the actuator stems 100a, 100b and the inner surface of the bores of the connectors 101, 102, and the annulus between the reduced diameter portion 128 of the outer cylindrical surface of the female connector 101 and the inner surface of the coupling face collar 113a, 113b gives the connectors 101, 102 room to tilt.

Each of the male and the female connectors 101, 102, has, in their initial untilted state, a centre axis parallel with the centre axis of the main body 114a, 114b. The helical connector spring 103a, 103b urges each connector 101, 102 to maintain its untilted state, but allows the connector 101, 102 to tilt when the connector 101, 102 is forced out of place.

The male connector 102 comprises a sealing ring forming a circumferential radial seal 109, surrounding the circumference of the first reduced diameter portion 126. The radial seal 109 has an outer diameter larger than the outer diameter of the face-seals 108a, 108b. The at least one radial seal 109 is located in at least one recess surrounding the first reduced diameter portion 126 of the male connector 102. The male connector 102, along with the at least one sealing ring 109, is able to slide axially within the female connector 101, maintaining the sealing provided by the at least one radial seal 109. The at least one radial seal 109 may also be located in at least one recess in the cylindrical inner surface 124.

External fluid is allowed to enter between the face collars 113a, 113b and the connectors 101, 102, in the annulus between the cylindrical surface section 121a, 121b and the connectors 101, 102, and in between the spherical rear surface of the connectors 101, 102 and the connector seat 111a, 111b, but not past the face-seals 108a, 108b.

As illustrated in FIGS. 2 and 3, the internal fluid is allowed to flow through one of the tubulars 107a, 107b, through the hollow spring seat collar 117a, 117b and the spring seat 110a, through the bore of the poppet valve body 116a, 116b, through the fluid passage slots 105a, 105b, through the annulus 120a, 120b, through the annulus between the actuator stems 100a, 100b and the inner surface of the connectors 101, 102, through the annulus 120a, 120b, through the fluid passage slots 105a, 105b, through the bore of the poppet valve body 116a, 116b, through the hollow spring seat 110a and the hollow spring seat collar 117a, 117b and finally through the other tubular 107a, 107b. The internal fluid is also allowed to enter between the male end portion 131 and circular inner surface 132, between the reduced diameter inner portion 123 and the second reduced diameter portion 125, and between the cylindrical inner surface 124 and the first reduced diameter portion 126, but not beyond the radial seal 109. The internal fluid is also allowed to enter between the connector seats 111a, 111b and the connectors 101, 102, but not beyond the face-seals 108a, 108b.

The radial seal 109 and each face-seal 108a, 108b provide a seal between the fluid inside and fluid outside of the coupler 10. The diameter of the sealing ring forming the face seal 108a, 108b is smaller the diameter of the radial seal 109a, 109b. This ensures that the internal hydrostatic/hydrodynamic pressure generated between the connectors 101, 102 acting parallel to the centre axis of connectors 101, 102, forcing the connectors 101, 102 rearwards against their connector seats 111a, 111b is larger than the internal hydrostatic/hydrodynamic pressure generated between the spherical rear surface of the connectors 101, 102 and the connector seats 111a, 111b acting parallel to the centre axis of connectors 101, 102 forcing the connectors away from their connector seats 111a, 111b.

The internal fluid pressure in the coupler 10 may be lower, higher or equal to the external hydrostatic and/or hydrodynamic pressure while maintaining the force on the face-seals 108a, 108b.

| | |
|---|---|
| 10 | Misalignment accommodating hydraulic coupler |
| 11 | Female coupling |
| 12 | Male coupling |
| 100 | Actuator stem |
| 101 | Female connector |
| 102 | Male connector |
| 103 | Helical connector spring |
| 104 | Helical valve body spring |
| 105 | Fluid passage slots |
| 106 | Poppet seal |
| 107 | Tubular |
| 108 | Face-seal |
| 109 | Radial seal |
| 110 | Spring seat |
| 111 | Connector seat |
| 112 | Spring collar |
| 113 | Coupling face collar |
| 114 | Main body |
| 115 | Transition section |
| 116 | Poppet valve body |
| 117 | Spring seat collar |
| 118 | Inner valve seat |
| 120 | Annulus |
| 121 | Cylindrical surface section |
| 122 | Step |
| 123 | Reduced diameter inner portion |
| 124 | Cylindrical inner surface |
| 125 | Second reduced diameter portion |
| 126 | First reduced diameter portion |
| 127 | First cylindrical outer surface |
| 128 | Reduced diameter portion |
| 129 | Second cylindrical outer surface |
| 130 | Female end portion |
| 131 | Male end portion |
| 132 | Circular inner surface |

The invention claimed is:

1. A hydraulic coupler comprising a female coupling adapted to be coupled to a male coupling, wherein each of the female coupling and the male coupling comprises:
   a flow path connecting portion;
   a poppet valve body moveably supported by an inner surface of a main body along its center axis;
   a valve body spring biasing the poppet valve body in a forward direction against a valve seat in the main body;
   an actuator stem on the poppet valve body;
   a movable connector, with a spherical portion seating against a spherical connector seat in the main body, the connector being provided with a through bore with a larger diameter than an actuator stem diameter, wherein the actuator stem extends through the through bore, and wherein the movable connector is one of a female connector and a male connector; and at least one sealing ring forming a face-seal sealing between the spherical portion seating and the spherical connector seat.

2. The hydraulic coupler according to claim 1, wherein at least one radial seal is provided, the radial seal providing sealing between an inner surface of the female connector and an outer surface of the male connector.

3. The hydraulic coupler according to claim 2, wherein a sealing diameter of the radial seal is larger than a sealing diameter of each face-seal of the couplings.

4. The hydraulic coupler according to claim 2, wherein the at least one radial seal is located in at least one recess surrounding the outer surface of the male connector.

5. The hydraulic coupler according to claim 2, wherein the at least one radial seal is located in at least one recess.

6. The hydraulic coupler according to claim 1, wherein each of the at least one face-seal is provided within a recess of the spherical portion of the connector.

7. The hydraulic coupler according to claim 1, wherein each of the at least one face-seal is provided within a recess of the connector.

8. The hydraulic coupler according to claim 1, wherein each connector is biased against the spherical connector seat by a spring, each spring being supported at its front end by a coupling face collar serving as a spring seat and supported at its rear end by a spring collar which is part of the connector.

* * * * *